(12) United States Patent
Kwon et al.

(10) Patent No.: US 9,164,547 B1
(45) Date of Patent: Oct. 20, 2015

(54) FOLDABLE DISPLAY APPARATUS

(71) Applicant: LG DISPLAY CO., LTD., Seoul (KR)

(72) Inventors: Su Chan Kwon, Seoul (KR); Sung Hun Kim, Paju-si (KR); Dal Jae Lee, Seoul (KR); Jun Jae Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/558,442

(22) Filed: Dec. 2, 2014

(30) Foreign Application Priority Data

Jul. 16, 2014 (KR) .................. 10-2014-0089514

(51) Int. Cl.
| | | |
|---|---|---|
| *G06F 1/16* | (2006.01) | |
| *H05K 5/00* | (2006.01) | |
| *H05K 5/02* | (2006.01) | |

(52) U.S. Cl.
CPC ............ *G06F 1/1641* (2013.01); *H05K 5/0017* (2013.01); *H05K 5/0217* (2013.01)

(58) Field of Classification Search
CPC ........................... H04M 1/0268; G06F 1/1652
See application file for complete search history.

(56) References Cited

U.S. PATENT DOCUMENTS

| | | | | |
|---|---|---|---|---|
| 6,016,176 | A * | 1/2000 | Kim et al. | 349/84 |
| 8,787,016 | B2 * | 7/2014 | Rothkopf et al. | 361/679.55 |
| 8,842,424 | B2 * | 9/2014 | Kemppinen | 361/679.27 |
| 2006/0146488 | A1 * | 7/2006 | Kimmel | 361/681 |
| 2010/0164837 | A1 * | 7/2010 | Kao et al. | 345/1.3 |
| 2010/0246113 | A1 * | 9/2010 | Visser et al. | 361/679.3 |
| 2013/0010405 | A1 | 1/2013 | Rothkopf et al. | |
| 2013/0021762 | A1 * | 1/2013 | Van Dijk et al. | 361/749 |
| 2013/0058063 | A1 * | 3/2013 | O'Brien | 361/807 |
| 2014/0126133 | A1 * | 5/2014 | Griffin et al. | 361/679.27 |
| 2014/0285476 | A1 * | 9/2014 | CHO et al. | 345/204 |

* cited by examiner

*Primary Examiner* — Anthony Q Edwards
(74) *Attorney, Agent, or Firm* — Dentons US LLP

(57) ABSTRACT

Disclosed is a foldable display apparatus which can stably maintain a bending curvature of a folded flexible display, and can maintain a bending display area of an unfolded flexible display in a plane state. The foldable display apparatus includes a display panel folded or unfolded with respect to a bending display area, a first housing configured to support a first area of the display panel, a second housing physically coupled to a second area of the display panel, a link assembly connected between the first and second housings, and configured to support a bending display area of the display panel which is folded or unfolded, and a sliding assembly configured to slide the first area or second area of the display panel according to bending of the link assembly.

9 Claims, 11 Drawing Sheets

FOLDABLE DISPLAY APPARATUS

CROSS-REFERENCE TO RELATED APPLICATIONS

This application claims the benefit of the Korean Patent Application No. 10-2014-0089514 filed on Jul. 16, 2014, which is hereby incorporated by reference for all purposes as if fully set forth herein.

BACKGROUND

1. Field of the Invention

The present invention relates to a foldable display apparatus. More particularly, the invention relates to a foldable display apparatus for minimizing a bending stress of a display panel.

2. Discussion of the Related Art

A display apparatus using a flat display panel, such as a liquid crystal display (LCD) apparatus, a plasma display apparatus, an organic light emitting display apparatus, an electrophoretic display apparatus, or an electro-wetting display apparatus, is generally applied to notebook computers, portable electronic devices, televisions (TVs), and monitors.

Recently, even in portable electronic devices, the demand for a large screen is increasing, and thus, an apparatus including a display unit displaying a large screen is being developed and commercialized by connecting a flat display panel. In particular, foldable display apparatuses using the merits of a flexible display panel which is bendable or foldable provide portable convenience and include a display unit which displays a large screen, and thus are attracting much attention as next-generation technology of the display field. The foldable display apparatus may be applied to various fields such as TVs and monitors, in addition to portable electronic devices such as mobile communication terminals, electronic notes, e-books, portable multimedia players (PMPs), navigation devices, ultra mobile personal computers (PCs), mobile phones, smartphones, tablet PCs.

Examples of foldable display apparatuses may include a flexible display apparatus disclosed in U.S. Patent Publication No. 2013/0010405 (hereinafter referred to as a prior art reference).

The flexible display apparatus disclosed in the prior art reference unfolds a flexible display with respect to a hinge having a link structure, thereby providing a large screen.

However, the flexible display apparatus disclosed in the prior art reference cannot stably maintain a bending curvature of a folded flexible display due to an empty space between housings caused by the hinge having the link structure, and cannot maintain a bending display area of an unfolded flexible display in a plane state.

SUMMARY

Accordingly, the present invention is directed to provide a foldable display apparatus that substantially obviates one or more problems due to limitations and disadvantages of the related art.

An aspect of the present invention is directed to provide a foldable display apparatus which can stably maintain a bending curvature of a folded flexible display, and can maintain a bending display area of an unfolded flexible display in a plane state.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a foldable display apparatus including: a display panel folded or unfolded with respect to a bending display area; a first housing configured to support a first area of the display panel; a second housing physically coupled to a second area of the display panel; a link assembly connected between the first and second housings, and configured to support a bending display area of the display panel which is folded or unfolded; and a sliding assembly configured to slide the first area or second area of the display panel according to bending of the link assembly.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
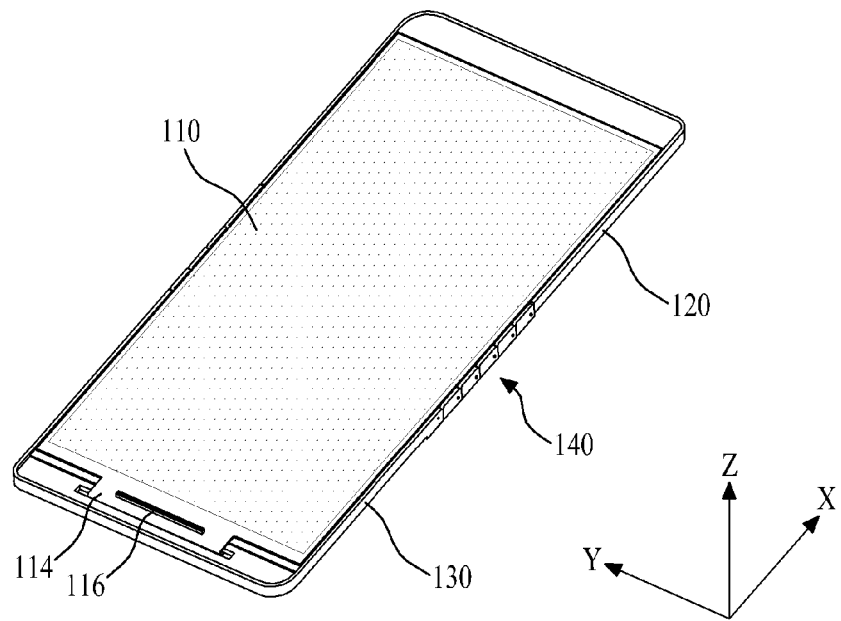
FIG. 1 is a diagram schematically illustrating an unfolded display panel in a foldable display apparatus according to a first embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "on" should be construed as including a case where one element is formed at a top of another element and moreover a case where a third element is disposed therebetween.

Hereinafter, exemplary embodiments of a foldable display apparatus according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 2:
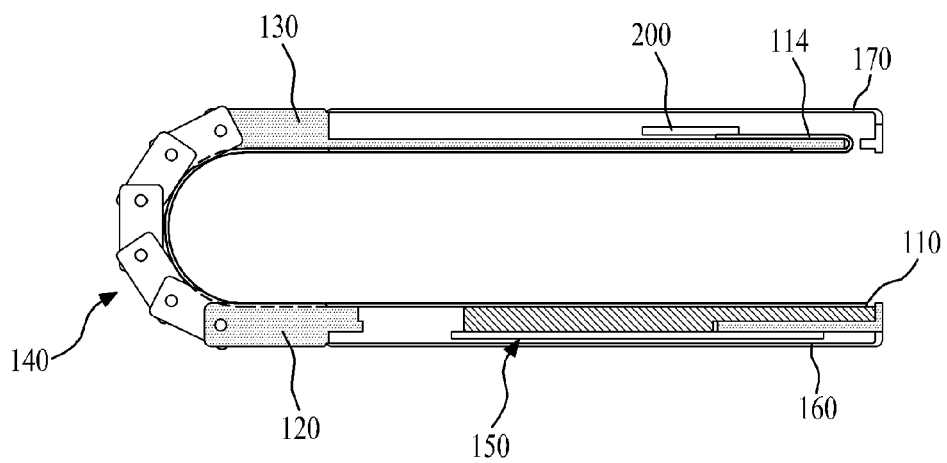
FIG. 2 is a diagram schematically illustrating a folded display panel in the foldable display apparatus according to the first embodiment of the present invention illustrated in FIG. 1.
Figure 3:
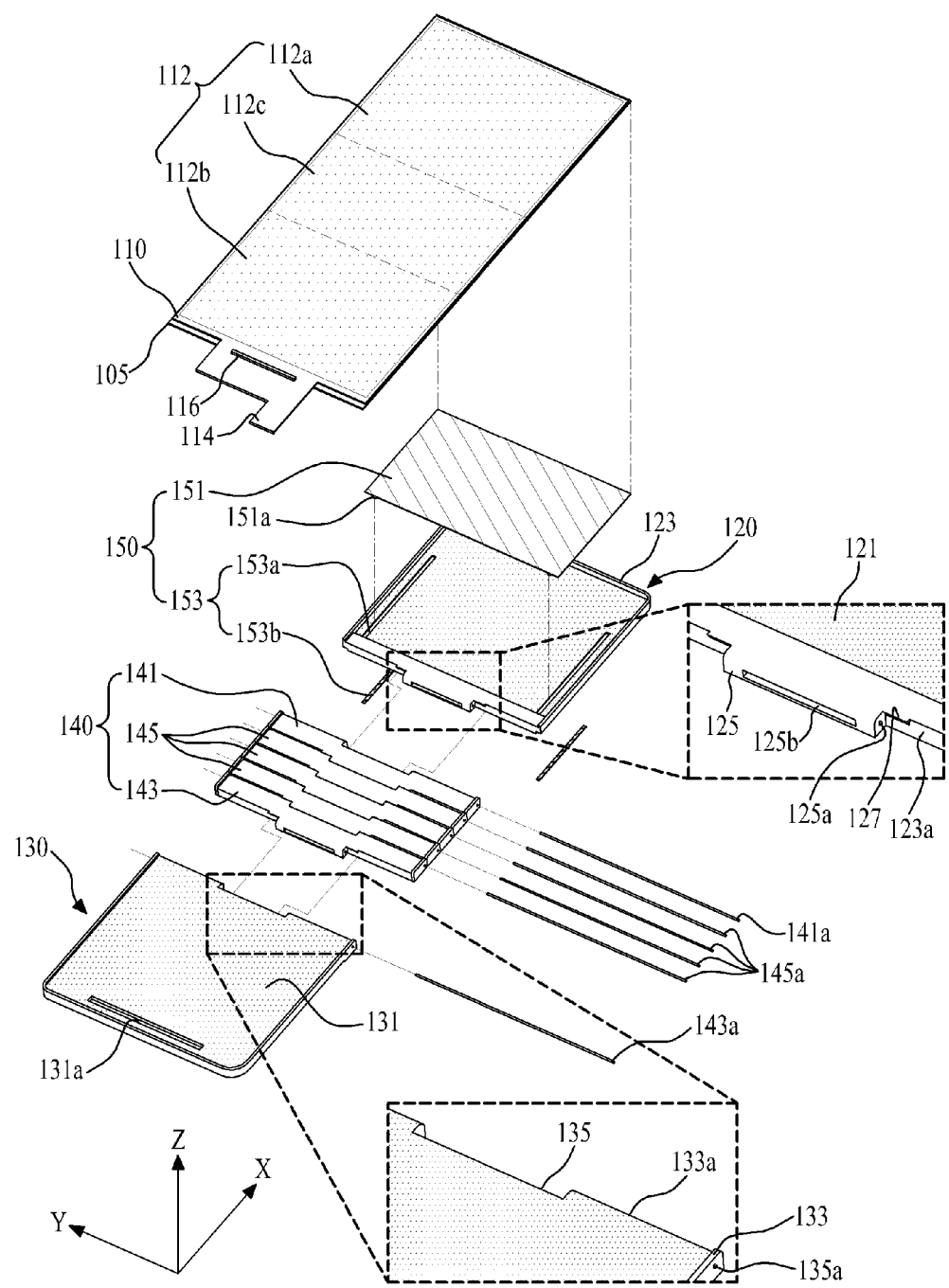
FIG. 3 is an exploded perspective view of the foldable display apparatus illustrated in FIG. 1.

FIG. 1 is a diagram schematically illustrating an unfolded display panel in a foldable display apparatus according to a first embodiment of the present invention. FIG. 2 is a diagram schematically illustrating a folded display panel in the foldable display apparatus according to the first embodiment of the present invention illustrated in FIG. 1. FIG. 3 is an exploded perspective view of the foldable display apparatus illustrated in FIG. 1.

Referring to FIGS. 1 to 3, the foldable display apparatus according to the first embodiment of the present invention includes a display panel 110, a first housing 120, a second housing 130, a link assembly 140, and a sliding assembly 150.

The display panel 110 may be a flexible display panel using a flexible substrate. For example, the display panel 110 may be a flexible organic light emitting display panel, a flexible electrophoretic display panel, a flexible liquid crystal display panel, or a flexible electro-wetting display panel.

The display panel 100 may include a flexible pixel array substrate, including a pixel array having an active matrix type, and an encapsulating member that protects the pixel array.

The flexible pixel array substrate may be formed of a plastic material or metal foil. For example, the flexible pixel array substrate formed of a plastic material may be formed of at least one selected from polyimide (PI), polyethyleneterephthalate (PET), polyethylenapthanate (PEN), polycarbonate (PC), polynorborneen (PNB), and polyethersulfone (PES).

The pixel array includes a plurality of pixels which are respectively formed in a plurality of pixel areas provided by intersections between a plurality of gate lines and a plurality of data lines. Each of the plurality of pixels includes a display device that displays an image corresponding to an image signal. Here, the display device may be an organic light emitting device, a liquid crystal display device, an electrophoretic device, or an electro-wetting display device.

When the display device is the organic light emitting device or the electrophoretic device, the encapsulating member according to an embodiment is formed on a flexible substrate to cover a pixel array, and may be a flexible encapsulating substrate or an encapsulating layer. When the display device is the liquid crystal display device, the electro-wetting display device, or the electrophoretic device, an encapsulating member according to another embodiment may be a flexible color filter substrate that includes a color filter corresponding to a pixel.

In addition, the display panel 110 may further include a polarizing film attached to the encapsulating member, but the polarizing film may be omitted for a flexibility of the display panel 110.

The display panel 110 includes a display area 112 that displays an image by using the pixel array including the plurality of pixels. The display area 112 may be divided into a first display area 112a, a second display area 112b, and a bending display area 112c.

The first display area 112a may be defined as a first area (for example, an upper area) of the display panel 110 disposed at one side of the bending display area 112c in the display area 112, and the second display area 112b may be defined as a second area (for example, a lower area) of the display panel 110 disposed at the other side of the bending display area 112c in the display area 112.

When the display panel 110 is unfolded to a plane state, the first display area 112a, the second display area 112b, and the bending display area 112c constitute one the display area 112, and thus, a relatively wide screen is provided.

When the display panel 110 is bent at a predetermined curvature with respect to the bending display area 112c, an image is not displayed in the display area 112.

The display panel 110 includes a signal applying unit 114 which extends from an edge of a first area or a second area to have a certain width and length. A plurality of link lines, connected to a signal line formed in the pixel array, are formed in the signal applying unit 114. The signal applying unit 114 is bent toward a rear surface of the second housing 130 through the second housing 130, and is connected to a system driver 200 which is disposed at the rear surface of the second housing 130. A driving integrated circuit (IC) 116, which drives a pixel formed in the display area 112 on the basis of a pixel driving signal and a data signal which are provided from the system driver 200, is mounted on the signal applying unit 114.

The display panel 110 may be attached to a flexible supporting plate 105. The flexible supporting plate 105 is attached to an entire rear surface of the display panel 110, and maintains the display panel 110, which is flexible, in a flat state. The flexible supporting plate 105 may be omitted depending on a flexible characteristic of the flexible pixel array substrate.

The foldable display apparatus according to the first embodiment of the present invention may further include a touch screen (not shown) for a user interface using a user's touch. The touch screen may be attached onto the display panel 110, or may be built into the display panel 110 at the same with a process of forming the pixel array.

The first housing 120 movably supports a first side rear surface of the display panel 110 which overlaps the first area (i.e., the first display area 112a) of the display panel 110. To this end, the first housing 120 according to an embodiment may include a bottom 121, a plurality of side walls 123, a first link connecting part 125, and a rotation binding boss 127.

The bottom 121 supports the first side rear surface of the display panel 110. In this case, the first side rear surface of the display panel 110 is not physically coupled to the bottom 121, and is movably disposed on the bottom 121.

The side walls 123 are formed to be vertical to a top edge of the bottom 121, and surround sides of the first area of the display panel 110 supported by the bottom 121. The side walls 123 protect the display panel 110, disposed on the bottom 121, from an external impact, and perform a guide function so that the display panel 110 and the sliding assembly 140 are smoothly moved.

The first link connecting part 125 protrudes from an inner wall 123a of the first housing 120 adjacent to a first side of the link assembly 140 to have a certain width and length, and is connected to the first side of the link assembly 140. For example, the first link connecting part 125 protrudes from a portion other than both edges of the inner wall 123a.

A first shaft inserting hole 125a and a first hollow part 125b are formed in the first link connecting part 125. The first shaft inserting hole 125a is formed to pass through the first link connecting part 125 along a length direction Y of the first link connecting part 125. The first hollow part 125b is formed to pass through the first link connecting part 125 so as to have a certain area along a protrusion direction X of the first link connecting part 125, and communicates with a circuit disposing groove (not shown) which is provided at a rear surface of the first housing 120.

The rotation binding boss 127 protrudes from an upper surface of the inner wall 123a of the first housing 120 adjacent to both sides of the first link connecting part 125, and binds rotation of the link assembly 140, thereby allowing the link assembly 140 not to rotate at a predetermined maximum rotation angle or more. To this end, the rotation binding boss 127 is formed at the inner wall 123a of the first housing 120 to have a right-triangular cross-sectional surface, and an inclined surface has a certain curvature to bind rotation of the link assembly 140. A protrusion length of the rotation binding boss 127 is set to correspond to a curvature size of the bending display area 112c which is formed when the display panel 110 is folded.

In addition, the rear surface of the first housing 120 is covered by a first rear cover 160. The first rear cover 160 is coupled to the rear surface of the first housing 120 to cover a semiconductor element necessary for driving of the display panel which is accommodated in the rear surface of the first housing 120.

A peripheral area adjacent to the first display area 112a of the display panel 110 coupled to the first housing 120 may be covered by a first front cover (not shown). The first front cover has a shape which covers only a left edge, a right edge, and an upper edge of the first display area 112a other than the first display area 112a and the bending display area 112c adjacent to the first display area 112a, and is coupled to the first housing 120.

The second housing 130 supports a second side rear surface of the display panel 110 which overlaps the second area (i.e., the second display area 112b) of the display panel 110. In this case, the second housing 130 is physically coupled to the second side rear surface of the display panel 110. To this end, the second housing 130 according to an embodiment may include a bottom 131, a plurality of side walls 133, and a second link connecting part 135.

The bottom 131 supports a second side rear surface of the display panel 110. In this case, the second side rear surface of the display panel 110 is physically coupled to the bottom 131 by a transparent adhesive, an adhesive sheet, or a double-sided tape (not shown).

A circuit through hole 131a, through which the signal applying unit 114 passes, is formed at the bottom 131. Therefore, the signal applying unit 114 is inserted into the circuit through hole 131a, bent at a certain curvature, and disposed at the rear surface of the second housing 130.

The side walls 133 are formed to be vertical to a top edge of the bottom 131 except an inner side of the bottom 131 connected to the link assembly 140. The side walls 133 surround second area sides of the display panel 110 physically coupled to the bottom 131, thereby protecting the display panel 110 from an external impact.

The second link connecting part 135 is recessed to have a certain width and length from an inner wall 133a of the second housing 130 adjacent to the second side of the link assembly 140, and connected to a second side of the link assembly 140. For example, the second link connecting part 135 is recessed to a certain depth from a portion other than both edges of the inner wall 133a along a length direction X of the second housing 130.

In the inner wall 133a of the second housing 130, a top corner of the other inner wall 133a in which the second link connecting part 135 is not provided and which faces the link assembly 140 may be rounded at a certain curvature.

A second shaft inserting hole 135a and a second hollow part (not shown) are formed at the second link connecting part 135. The second shaft inserting hole 135a is formed along a length direction Y of the inner wall 133a to pass through the inner wall 133a of the second housing 130 which is parallel with each other with the second link connecting part 135 therebetween.

The second hollow part is formed to pass through the second link connecting part 135 so as to have a certain area along the length direction X of the second housing 130. The second hollow part communicates with a circuit disposing groove (not shown) which is provided at the rear surface of the second housing 130. The second hollow part acts as a path through which a cable and/or a signal transfer film, which connect(s) the first and second housings 120 and 130 to the system driver 200 which is disposed at the rear surfaces of the first and second housings 120 and 130, pass(s).

In addition, the rear surface of the second housing 130 is covered by the second rear cover 170. The second rear cover 170 is coupled to the system driver 200, accommodated in the rear surface of the second housing 130, and the rear surface of the second housing 130 to cover a battery (not shown).

A peripheral area adjacent to the second display area 112b of the display panel 110 coupled to the second housing 130 may be covered by a second front cover (not shown). The second front cover has a shape which covers the second display area 112b, a left edge, a right edge, and an upper edge of the second display area 112b except the bending display area 112c adjacent to the second display area 112b, the signal applying unit 114, and the driving IC 116, and is coupled to the second housing 130.

The link assembly 140 is connected between the first and second housings 120 and 130, guides unfolding and folding of the display panel 110, and supports the bending display area 112c of the unfolded or folded display panel 110. To this end, the link assembly 140 according to an embodiment may include a first link bar 141, a second link bar 143, and a plurality of middle link bars 145.

Figure 4:
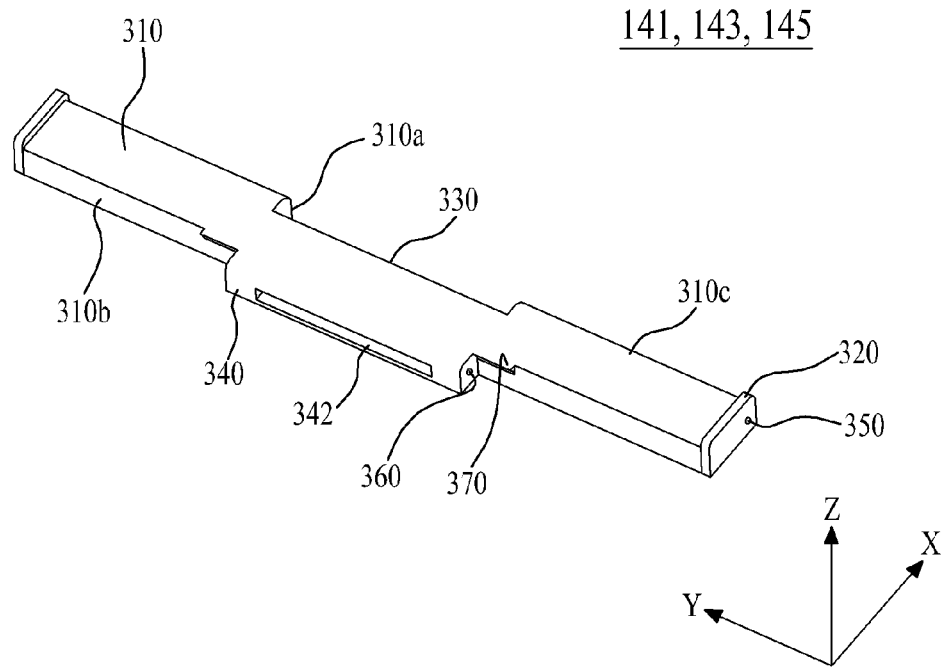
FIG. 4 is a diagram describing a link bar illustrated in FIG. 3.
Figure 5:
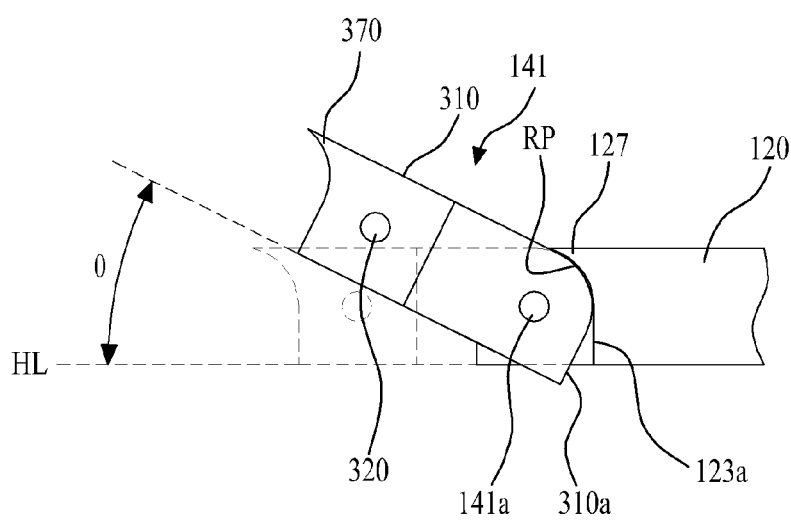
FIG. 5 is a diagram describing rotation of a first link bar illustrated in FIGS. 3 and 4.

The first link bar 141 is rotatably connected to the first housing 120. To this end, as illustrated in FIGS. 4 and 5, the first link bar 141 according to an embodiment includes a body 310, a pair of guide side walls 320, a front connecting part 330, a rear connecting part 340, a front shaft hole 350, a rear shaft hole 360, and a stopper 370.

The body 310 is provided in parallel with the inner wall 123a of the first housing 120 to have a bar shape having a tetragonal cross-sectional surface, and supports a rear surface of the display panel 110 which overlaps the bending display area 112b of the display panel 110. In this case, a front side 310a of the body 310 has a vertical surface which is directly opposite to the inner wall 123a of the first housing 120. An upper corner between the front side 310a and a top of the body 310 has a rounding part RP having a certain curvature for a first-direction rotation of the first link bar 141.

The pair of guide side walls 320 are vertically provided to have a certain height from both edges of the body 310 with respect to a length direction Y of the body 310. The pair of guide side walls 320 surround both sides of the display panel 110, disposed at the top of the body 310, with respect to a length direction X of the display panel 110 in order for a side of the display panel 100 not to be exposed to the outside, and guides moving of the display panel 110.

The front connecting part 330 is recessed from the front side 310a of the body 310 in order for the first link connecting part 125 of the first housing 120 to be inserted thereinto. In this case, the front connecting part 330 has the same shape as that of the first link connecting part 125, and is rotatably connected to the first link connecting part 125.

The rear connecting part 340 protrudes from the rear side 310b of the body 310 in order to be inserted into the second link connecting part 135 of the second housing 130. In this case, the rear connecting part 340 has the same shape as that of the second link connecting part 135, and is rotatably connected to the second link connecting part 135.

A second hollow part 342 is formed at the rear connecting part 340. The second hollow part 342 is formed to pass through the body 310 along a width direction X of the body 310, and communicates with the first hollow part 125b of the first housing 120.

The front shaft hole 350 is formed at a front edge of the body 310 which is parallel with each other with the front connecting part 330 therebetween. The front shaft hole 350 is formed to pass through the front edge of the body 310 along the length direction Y of the body 310.

The rear shaft hole 350 is formed to pass through the rear connecting part 330 along the length direction Y of the body 310.

The stopper 370 protrudes from an upper surface of the rear side 310b of the body 310 adjacent to both sides of the rear connecting part 340, and binds rotation of the middle link bar 145 adjacent thereto, thereby allowing the middle link bar 145 not to rotate at a predetermined maximum rotation angle or more. To this end, the stopper 370 is provided at the rear side 310b of the body 310 to have a right-triangular cross-sectional surface, and an inclined surface has a certain curvature to bind rotation of the middle link bar 145. A protrusion length of the stopper 370 is set to correspond to a curvature size of the bending display area 112c which is formed when the display panel 110 is folded.

The first link bar 141 is connected to the first link connecting part 125 of the first housing 120 by a first shaft 141a which is inserted into the front shaft hole 350 and the first shaft inserting hole 125a of the first housing 120. Here, the first shaft 141a is disposed to be inserted into and hanged between the front shaft hole 350 and the first shaft inserting hole 125a, rotatably supports the first link bar 141 and the first link connecting part 125, and prevents the first link bar 141 and the first link connecting part 125 from being detached or bent by an external force.

Therefore, the first link bar 141 may rotate at a predetermined angle "A" with respect to a horizontal line HL with the first shaft 141a as a rotation axis. For example, when the display panel 110 is folded, the first link bar 141 rotates in a first direction (for example, clockwise) by a predetermined angle "A" from a plane state HL until the rounding part RP which is provided at an upper corner of the front side 310a physically contacts the rotation binding boss 127 of the first housing, and thus guides folding of the display panel 110. Also, when the display panel 110 is unfolded, the first link bar 141 rotates in a second direction (for example, counterclockwise) from a rotated state until a vertical surface of front side 310a physically contacts the inner side 123a of the first housing 120, and thus guides unfolding of the display panel 110, and supports the bending display area 112c of the unfolded display panel 110.

The second link bar 143 is rotatably connected to the second housing 130. The second link bar 143, as illustrated in FIG. 4, includes the body 310, the pair of guide side walls 320, the front connecting part 330, the rear connecting part 340, the front shaft hole 350, the rear shaft hole 360, and the stopper 370. This is the same as the above-described first link bar 143, except that the second link bar 143 is connected to the second housing 130, and thus, repetitive descriptions on the elements are not provided. The second link bar 143 is connected to the second link connecting part 135 of the second housing 130 by a second shaft 143a which is inserted into the rear shaft hole 360 and the second shaft inserting hole 135a of the second housing 130. Therefore, the second housing 130 may rotate at the predetermined angle "θ" with respect to the horizontal line HL with the second shaft 143a as a rotation axis.

The plurality of middle link bars 145 are connected to each other to be rotatable by the predetermined angle "θ" with respect to the horizontal line HL between the first link bar 141 and the second link bar 143. Each of the plurality of middle link bars 145, as illustrated in FIG. 4, includes the body 310, the pair of guide side walls 320, the front connecting part 330, the rear connecting part 340, the front shaft hole 350, the rear shaft hole 360, and the stopper 370. This is the same as the above-described first link bar 143, except that the plurality of middle link bars 145 are connected to each other by a plurality of third shafts 145a to be rotatable between first link bar 141 and the second link bar 143, and thus, repetitive descriptions on the elements are not provided.

Since the first link bar 141, the second link bar 143, and the plurality of middle link bars 145 are connected to each other to be rotatable by the predetermined angle "θ" from the plane state HL by the stopper 370, when the display panel 110 is folded, the link assembly 140 guides folding of the display panel 110 so that the bending display area 112c is folded at a predetermined curvature or is unfolded to a plane state according to a rotation angle of each of the link bars 141, 143 and 145. In this case, the body 310 of each of the link bars 141, 143 and 145 supports the bending display area 112c that is folded at the predetermined curvature or is unfolded to the plane state, and thus stably maintains a curvature of the folded bending display area 112c, and maintains the bending display area 112c, unfolded to the plane state, in the plane state.

Referring again to FIGS. 1 to 3, the sliding assembly 150 is coupled to the first area of the display panel 110, and slides the first area of the display panel 110 according to bending of the link assembly 140, thereby compensating for a length deviation which occurs when the display panel 110 is folded or unfolded. That is, in a case where the first and second areas of the display panel 110 are respectively fixed to the first and second housings 120 and 130 so as not to be moved, a bending stress is applied to the display panel 110 when the display panel 110 is folded or unfolded, and due to a curvature radius difference between the display panel 110 and the link assembly 140, the bending display area 112c is creased or stretched when the display panel 110 is folded or unfolded, causing a damage of the bending display area 112c. In order to solve such a problem, the sliding assembly 150 slides the first display area 112a of the display panel 110 in interoperation with bending of the link assembly 140.

Figure 6:
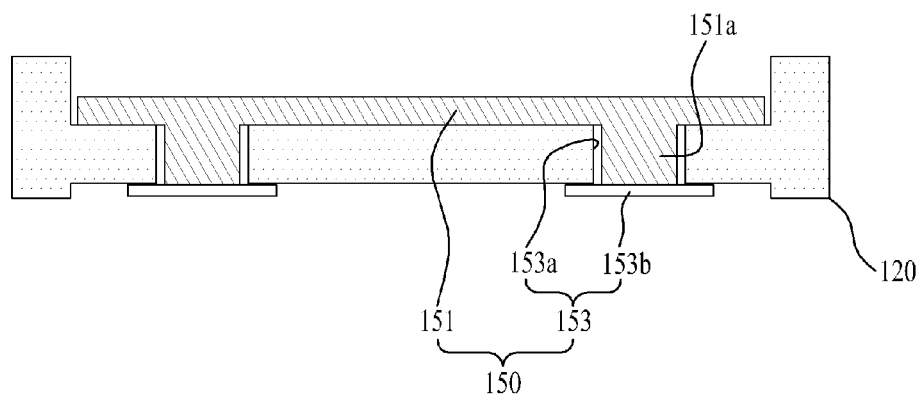
FIG. 6 is a cross-sectional view describing a sliding assembly illustrated in FIG. 3.

The sliding assembly 150 according to an embodiment, as illustrated in FIGS. 3 and 6, includes a slider 151 and a guider 153.

The slider 151 is movably disposed at the bottom 121 of the first housing 120, and is coupled to the first side rear surface of the display panel 110. In this case, the slider 151 has a plate shape, and is coupled to the first side rear surface of the display panel 110 by an adhesive, a double-sided adhesive sheet, or a double-sided tape. The slider 151 includes a pair of rails 151a that protrude toward the bottom 121 of the first housing 120. The pair of rails 151a are movably disposed at the guider 153. The slider 151 is slid on the bottom 121 of the first housing 120 according to bending of the bending display area 112c that interoperates with bending of the link assembly 140, and thus slides the first area of the display panel 110.

The guider 153 is provided at the first housing 120, and guides moving of the slider 151. The guider 153 according to an embodiment includes a pair of guide holes 153a and a pair of plates 153b.

The pair of guide holes 153a are arranged in parallel to pass through the bottom 121 of the first housing 120. The pair of rails 151a provided at the slider 151 are respectively inserted into the pair of guide holes 153a. In this case, in order for the pair of rails 151a to be smoothly moved, a width of each of the pair of guide holes 153a may be broader than that of each of the rails 151a.

The pair of plates 153b are disposed at a bottom of the first housing 121, respectively inserted into the pair of guide holes 153a, and respectively coupled to the pair of rails 151a. The pair of plates 153b are respectively coupled to the pair of rails 151a by screws, and prevent the rails 151a from being detached from the guide holes 153a.

Figure 7:
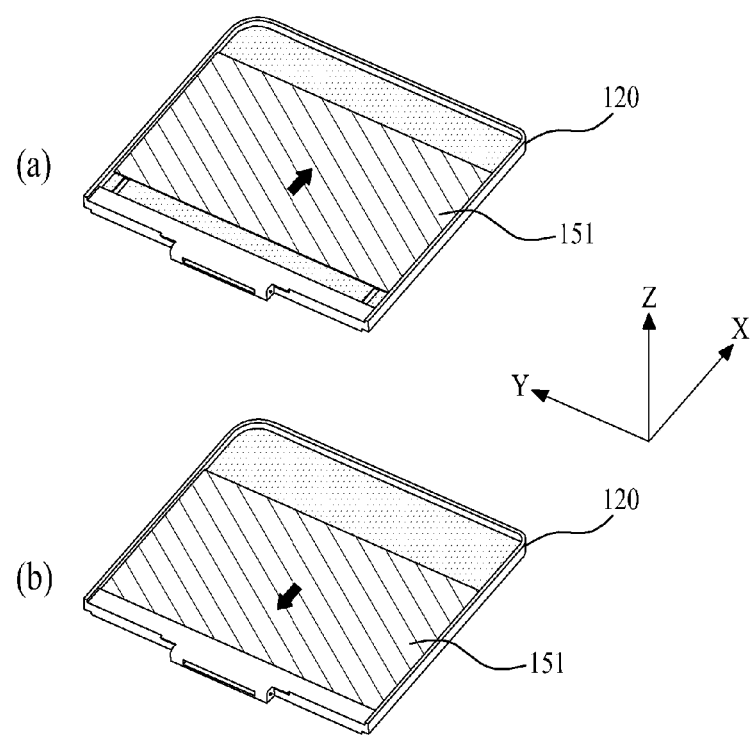
FIG. 7 is a diagram describing sliding of a slider illustrated in FIGS. 3 and 6.

When the display panel 110 is folded, as illustrated in FIG. 7 (a), the link assembly 140 and the bending display area 112c are bent at a certain curvature, and thus, the slider 151 of the sliding assembly 150 is slid in a direction opposite to a direction facing the link assembly 140 to slide the first area of the display panel 110, thereby allowing the bending display area 112c of the display panel 110 to be bent at a predetermined curvature. Also, when the display panel 110 is unfolded, as illustrated in FIG. 7 (b), the link assembly 140 and the bending display area 112c which are bent at the certain curvature are unfolded to a plane state, and thus, the slider 151 of the sliding assembly 150 is slid toward the link assembly 140 to slide the first area of the display panel 110, thereby allowing the bending display area 112c of the display panel 110 to be unfolded to the plane state. As a result, the sliding assembly 150 slides the first area of the display panel 110 in interoperation with the bending of the link assembly 140 and the bending display area 112c, and thus allows the bending display area 112c of the display panel 110 to be folded at a certain curvature or unfolded to a plane state.

Figure 8:
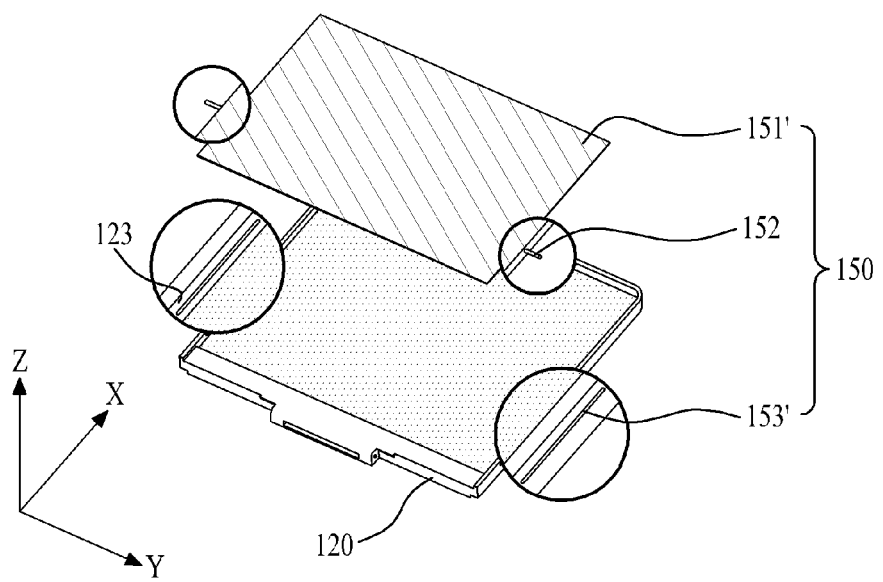
FIG. 8 is a diagram describing a modification example of a sliding assembly illustrated in FIGS. 2 and 3.

FIG. 8 is a diagram describing a modification example of the sliding assembly illustrated in FIGS. 2 and 3.

Referring to FIGS. 3 and 8, a sliding assembly 150 according to the modification example includes a slider 151', a pair of sliding shafts 152, and a guider 153'.

The slider 151' is movably disposed at the bottom 121 of the first housing 120, and coupled to the first side rear surface of the display panel 110. In the case, the slider 151' is provided in a plate shape, and coupled to the first side rear surface of the display panel 110 by an adhesive, a double-sided adhesive sheet, or a double-sided tape. The slider 151' is slid on the bottom 121 of the first housing 120 according to bending of the bending display area 112c which interoperates with bending of the link assembly 140, and thus slides the first area of the display panel 110.

The pair of sliding shafts 152 are provided at both sides of the slider 151' parallel to the length direction X of the display panel 110, and is movably connected to the guider 153'. Here, the pair of sliding shafts 152 may be inserted into and coupled to the both sides of the slider 151' to a certain depth, or may protrude to the both side walls 123 of the first housing 120 to have a certain length from the both sides of the slider 151'.

The guider 153' is provided at the both side walls 123 of the first housing 120 parallel to the both sides of the slider 151', and guides moving of the slider 151'. The guider 153' according to an embodiment may include a pair of guide holes.

The pair of guide holes may be formed to pass through the both side walls 123 of the first housing 120 so as to have a certain length. The pair of sliding shafts 152 are movably inserted into and disposed in the pair of guide holes, respectively.

The sliding assembly 150' according to the modification example, as illustrated in FIG. 7, slides the first area of the display panel 110 in interoperation with bending of the link assembly 140 and the bending display area 112c, and thus allows the bending display area 112c of the display panel 110 to be folded at a certain curvature or unfolded to a plane state.

Therefore, in a foldable display apparatus including the sliding assembly 150' according to the modification example, the pair of sliding shafts 152 are provided at sides of the slider 151', and the pair of guide holes are also formed at side walls of the first housing 120, thereby reducing a thickness of the first housing 120.

Figure 9:
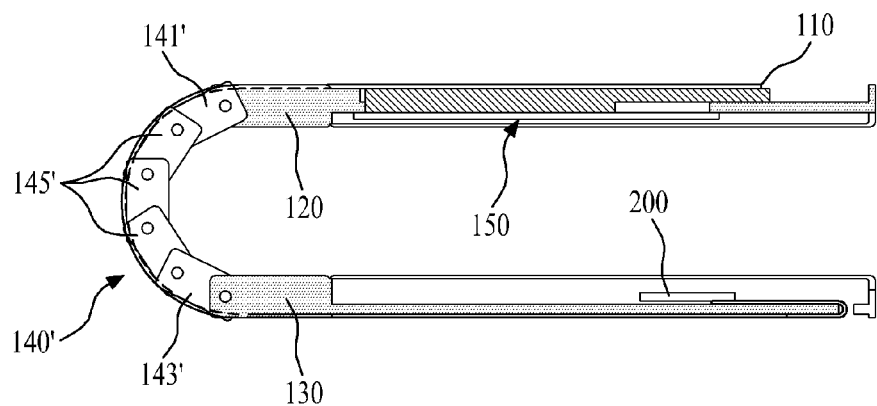
FIG. 9 is a diagram illustrating a folded display panel in a foldable display apparatus according to a second embodiment of the present invention.

FIG. 9 is a diagram illustrating a folded display panel in a foldable display apparatus according to a second embodiment of the present invention, and illustrates a display panel in which a bending direction is changed. That is, in the foldable display apparatus according to the first embodiment of the present invention illustrated in FIGS. 1 to 8, the first and second display areas 112a and 112b are folded to directly face each other with respect to the bending display area 112c of the display panel 110 along a rotation direction of each of the link bars 141, 143 and 145 configuring the link assembly 140. On the other hand, in the foldable display apparatus according to the second embodiment illustrated in FIG. 9, the rotation direction of each of the link bars 141, 143 and 145 configuring the link assembly 140 is changed, the first and second display areas 112a and 112b are folded in an outer direction with respect to the bending display area 112c of the display panel 110. To this end, except that a link assembly 140' is provided in a type where is inverted upward and downward, the foldable display apparatus according to the second embodiment is configured identically to the foldable display apparatus according to the first embodiment. The link assembly 140' is configured identically to the link assembly 140 of FIG. 3, but is provided in a type where is inverted upward and downward. Also, the link assembly 140' is connected between the first and second housings 120 and 130.

The display area 112 of the folded display panel 110 is exposed to the outside, and thus, the first display area 112a, second display area 112b, and bending display area 112c of the display panel 110 constitute different areas even in a folded state, thereby providing different screens. For example, in the folded display panel 110, an image may not be displayed in the first and second display areas 112a and 112b, or the same image or different images may be simultaneously or selectively displayed in the first and second display areas 112a and 112b. Particularly, in the folded display panel 110, the bending display area 112c may constitute a sub-screen, and display a sub-image. Here, the sub-image may be system setting information, the balance of a battery, a sensitivity of wireless communication, time information, and a message reception icon.

Figure 10:
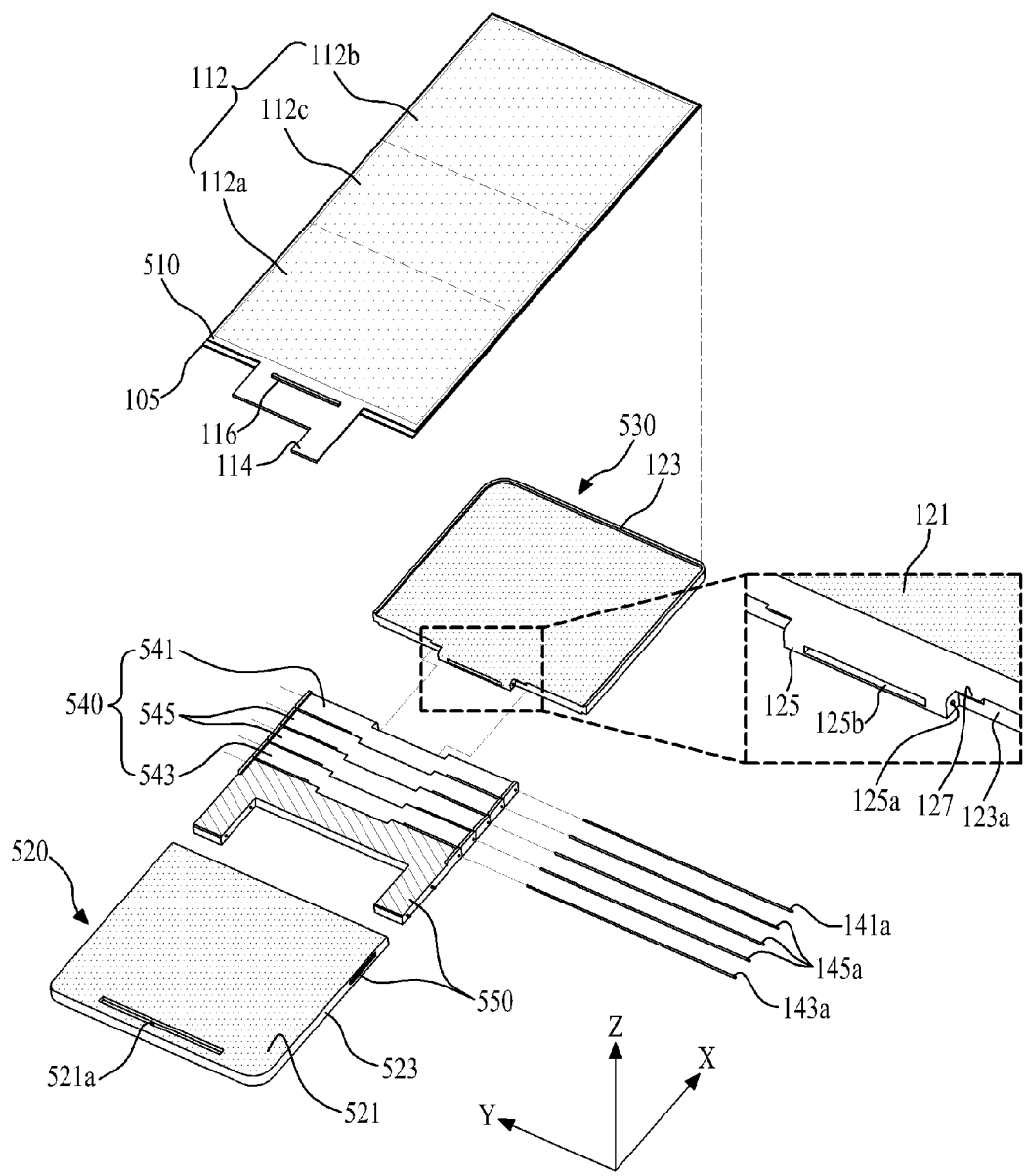
FIG. 10 is an exploded perspective view of a foldable display apparatus according to a third embodiment of the present invention.
Figure 11:
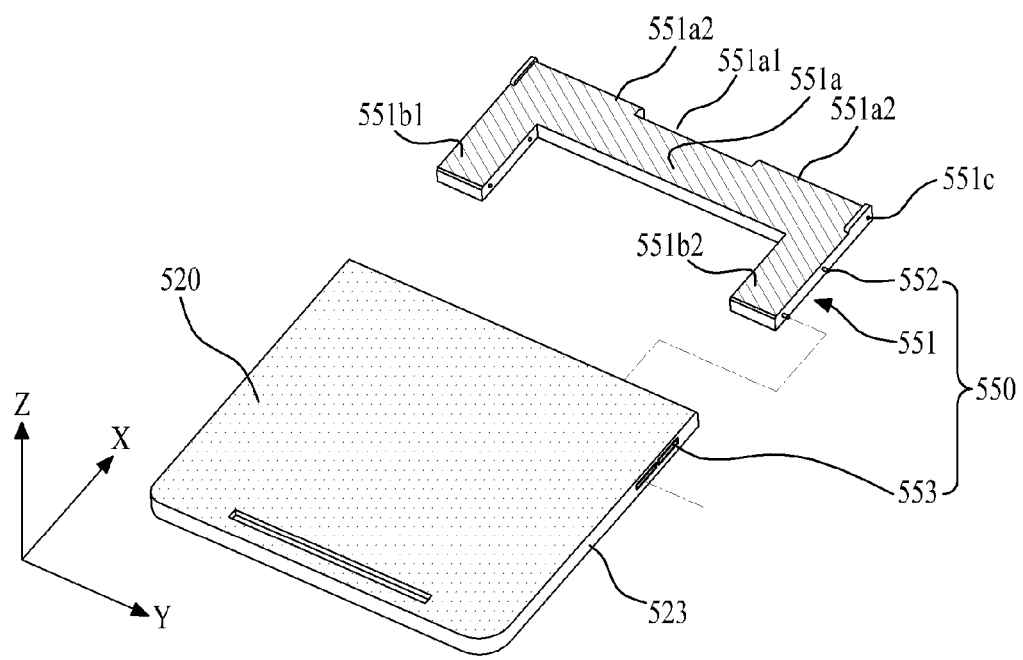
FIG. 11 is an exploded perspective view for describing a sliding assembly illustrated in FIG. 10.
Figure 12:
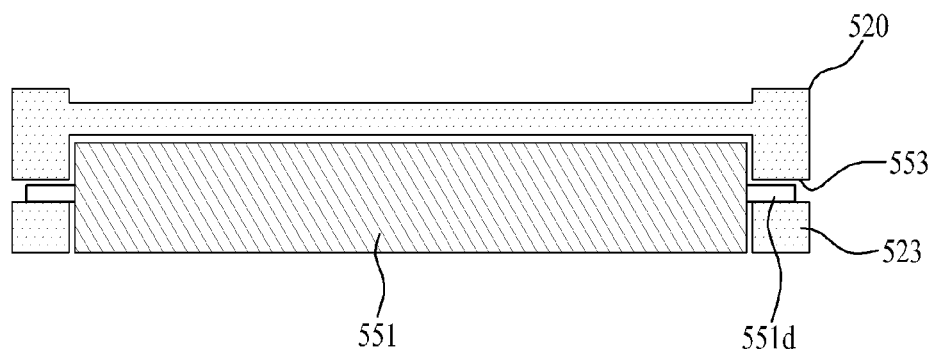
FIG. 12 is a cross-sectional view for describing a connection structure between a slider and guider illustrated in FIG. 10.

FIG. 10 is an exploded perspective view of a foldable display apparatus according to a third embodiment of the present invention. FIG. 11 is an exploded perspective view for describing a sliding assembly illustrated in FIG. 10. FIG. 12 is a cross-sectional view for describing a connection structure between a slider and guider illustrated in FIG. 10.

Referring to FIGS. 10 to 12, the foldable display apparatus according to the third embodiment of the present invention includes a display panel 510, a first housing 520, a second housing 530, a link assembly 540, and a sliding assembly 550.

The display panel 510 includes a first display area 112a, a second display area 112b, and a bending display area 112c, and except that the first and second display areas 112a are switched in their disposed positions, the display panel 510 is the same as the display panel 110 of FIG. 1. Thus, a repetitive description is not provided.

The first housing 520 is coupled to a first side rear surface of the display panel 510 which overlaps a first area (i.e., the first display area 112a) of the display panel 510. To this end, the first housing 520 according to an embodiment includes a bottom 521 and a plurality of side walls 523.

The bottom 521 is coupled to the first side rear surface of the display panel 510. In this case, the bottom 521 is physically coupled to a second side rear surface of the display panel 510 by a transparent adhesive, an adhesive sheet, or a double-sided tape (not shown). A circuit through hole 521a, through which a signal applying unit 114 of the display panel 510 passes, is formed at the bottom 521. Therefore, the signal applying unit 114 is inserted into the circuit through hole 131a, bent at a certain curvature, and disposed at a rear surface of the first housing 520.

The side walls 521 are vertically provided at a lower left side, a lower right side, and a rear edge other than a front edge of the bottom 521, respectively. A sliding space of the sliding assembly 550 is provided at a rear surface of the first housing 520, and thus, the side walls 521 guide sliding of the sliding assembly 550 in order for the sliding assembly 550 to be smoothly slid (or moved). In addition, the side walls 521 may be additionally provided to have a certain height from an upper left side, an upper right side, and a rear edge of the bottom 521 so as to surround three sides of the display panel 510 coupled onto the bottom 521.

The second housing 530 supports a second side rear surface of the display panel 510 which overlaps a second area (i.e., the second display area 112b) of the display panel 510. Except that the second housing 530 is physically coupled to the second side rear surface of the display panel 510, the second housing 530 is the same as the first housing 120 of FIG. 3. Thus, like reference numerals refer to like elements, and repetitive descriptions on the same elements are not provided.

The link assembly 540 is connected between the first and second housings 520 and 530, guides unfolding and folding of the display panel 110, and supports the bending display area 112c of the unfolded or folded display panel 110. To this end, the link assembly 540 according to an embodiment may include a first link bar 541, a second link bar 543, and a plurality of middle link bars 545.

Except that the first link bar 541 is rotatably connected to a first link connecting part 125 of the second housing 530, the first link bar 541 is the same as the first link bar 141 of FIGS. 3 and 4, and thus, its repetitive description is not provided. The first link bar 541 is connected to the first link connecting part 125 of the second housing 530 by a first shaft 141a inserted into the front shaft hole 350 (see FIG. 4) and a first shaft inserting hole 125a of the second housing 530, and thus may rotate by a predetermined angle "A" with respect to a horizontal line HL with the first shaft 141a as a rotation axis.

The second link bar 543 is rotatably connected to the sliding assembly 550. Except that the second link bar 543 is connected to the sliding assembly 550, the second link bar 543 is the same as the first link bar 141 of FIGS. 3 and 4, and thus, its repetitive description is not provided. The second link bar 543 is connected to the sliding assembly 550 by a second shaft 143a inserted into the rear shaft hole 360 (see FIG. 4) and the sliding assembly 550, and thus may rotate by the predetermined angle "A" with respect to the horizontal line HL with the second shaft 143a as a rotation axis.

Each of the plurality of middle link bars 545 is connected between the first link bar 541 and the second link bar 543 to rotate by the predetermined angle "A" with respect to the horizontal line HL. Each of the plurality of middle link bars 545 is configured identically to the first link bar 141 of FIGS. 3 and 4, and is connected between the first link bar 541 and the second link bar 543 to be rotated by a plurality of third shafts 145a, and thus, their repetitive descriptions are not provided.

Since the first link bar 541, the second link bar 543, and the plurality of middle link bars 545 are connected to each other to be rotatable by the predetermined angle "0" from the plane state HL by the stopper 370, when the display panel 110 is folded, the link assembly 540 slides the sliding assembly 550 according to a rotation angle of each of the link bars 541, 543 and 545, and thus guides folding or unfolding of the bending display area 112c so that the bending display area 112c is folded at a predetermined curvature or is unfolded to a plane state by moving of the second housing 530 based on the sliding of the sliding assembly 550.

The sliding assembly 550 is coupled to the first area of the display panel 510, movably connected to the first housing 520, and slid according to bending of the link assembly 540 to slide the link assembly 540 and the second housing 530, thereby compensating for a length deviation which occurs when the display panel 510 is folded or unfolded. That is, in a case where the first and second areas of the display panel 510 are respectively fixed to the first and second housings 520 and 530 so as not to be moved, a bending stress is applied to the display panel 510 when the display panel 510 is folded or unfolded, and due to a curvature radius difference between the display panel 510 and the link assembly 540, the bending display area 112c is creased or stretched when the display panel 510 is folded or unfolded, causing a damage of the bending display area 112c. In order to solve such a problem, the sliding assembly 550 is slid in interoperation with bending of the link assembly 540 to slide the link assembly 540 and the second housing 530, thereby sliding the second display area 112b of the display panel 510.

The sliding assembly 550 according to an embodiment, as illustrated in FIGS. 10 to 12, includes a slider 551, a pair of sliding shafts 552, and a guider 553.

The slider 551 is movably disposed at a rear surface of the first housing 520, and may have a shape in which an element accommodating space provided at the rear surface of the first housing 520 is secured as large as possible. For example, the slider 551 may have a ⊃-shaped plane, and include a link coupling part 551a, a pair of wing parts 551b1 and 551b2, and a shaft disposing hole 551c.

The link coupling part 551a is rotatably connected to the second link bar 543 of the link assembly 540. A link coupling groove 551a1 into which a rea coupling part 340 of the second link bar 543 is inserted is formed at a side of the link coupling part 551a.

The pair of wing parts 551b1 and 551b2 are arranged in parallel to have a certain length in a direction from both edges of the link coupling part 551a to the first housing 520 with respect to a length direction Y of the link coupling part 551a.

The shaft disposing hole 551c is formed at each of front edges 551a2 of the link coupling part 551a which are disposed in parallel with the ling coupling groove 551a1 therebetween. The shat disposing hole 551c is formed to pass through the front edges 551a2 of the link coupling part 551a along the length direction Y of the link coupling part 551a.

The slider 551 is connected to the rear coupling part 340 of the second link bar 543 by a second shaft 143a inserted into the shaft disposing hole 551c and a rear shaft hole 360 of the second link bar 543, and is slid according to bending of the link assembly 540. Here, the second shaft 143a is disposed to be inserted into and hanged between the shaft disposing hole 551c and the rear shaft hole 360, rotatably supports the slider 551 and the second link bar 543 which are connected to each other, and prevents the slider 551 and the second link bar 543 from being detached or bent by an external force.

The pair of sliding shafts 552 are respectively provided at both sides of the slider 551 parallel to a length direction X of the display panel 510, and is movably connected to the guider 553. A plurality of the sliding shafts 552 may be arranged at certain intervals, for a stabler straight-line motion of the slider 551. The pair of sliding shafts 552 may be inserted into and coupled to both sides of the slider 551 to a certain depth, or may protrude to the both side walls 523 of the first housing 520 to have a certain length from the both sides of the slider 551.

A plurality of the guiders 553 are respectively provided at the both side walls 523 of the first housing 520 parallel to the both sides of the slider 551, and guide moving of the slider 551. The guider 553 according to an embodiment may include a pair of guide holes.

The pair of guide holes may be formed to pass through the both side walls 523 of the first housing 520 to have a certain length. The pair of sliding shafts 552 are movably inserted into and disposed at the pair of guide holes.

The sliding assembly 550 slides the link assembly 540 in interoperation with bending of the link assembly 540 and the bending display area 112c to slide the second housing 530 coupled to the second area of the display panel 510, thereby allowing the bending display area 112c of the display panel 510 to be folded at a certain curvature or unfolded to a plane state.

Figure 13:
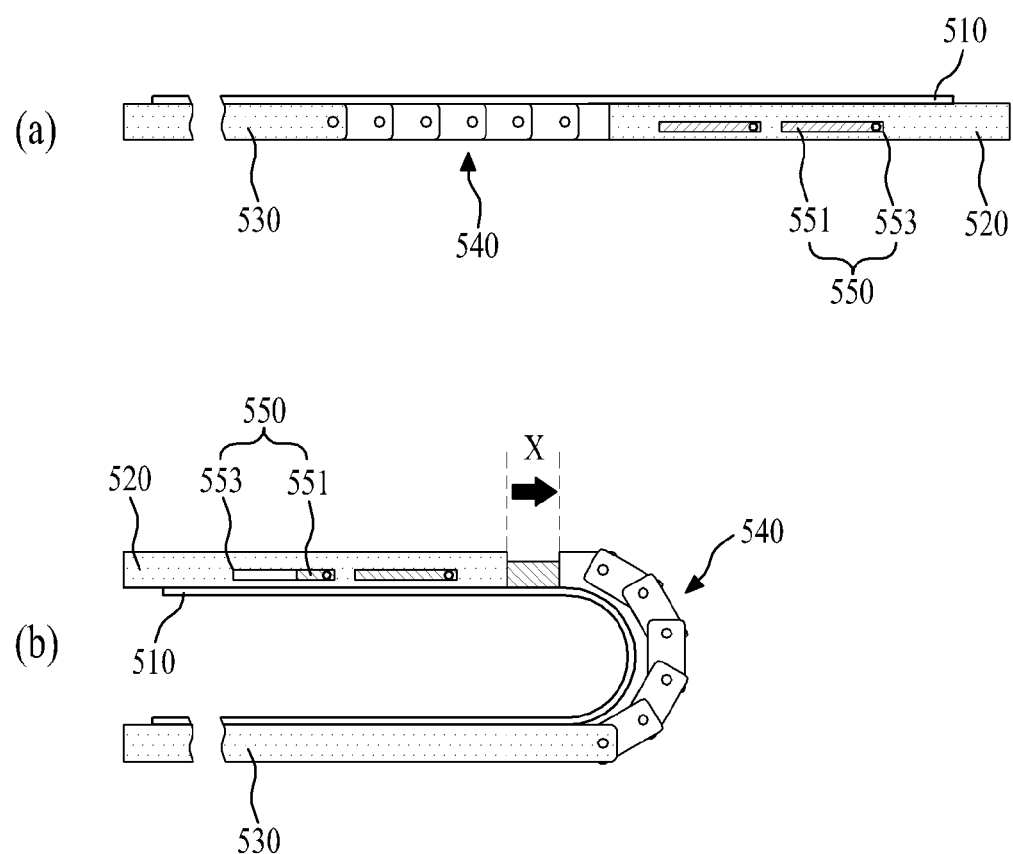
FIG. 13 is a diagram describing sliding of a sliding assembly in unfolding or folding a display panel, in the foldable display apparatus according to the third embodiment of the present invention.

For example, as illustrated in FIG. 13A, when the display panel 510 is unfolded, the link assembly 540 rotates in a plane state, and thus, the slider 551 of the sliding assembly 550 is slid toward the first housing 520 to attract the link assembly 540 and the second housing 530, thereby allowing the display panel 510 to be unfolded to a plane state. Therefore, the link assembly 540 is in a plane state, and supports the bending display area 112c of the display panel 510, thereby preventing the bending display area 112c of the unfolded display panel 510 from being recessed by an external force.

Moreover, as illustrated in FIG. 13B, when the display panel 510 is folded, the link assembly 540 is bent, and thus, the slider 551 of the sliding assembly 550 is slid (X) toward the second housing 530 to push the link assembly 540 and the second housing 530, thereby allowing the display panel 510 to be folded at a predetermined curvature. Therefore, the link assembly 540 supports the bent bending display area 112c of the display panel 510 to guide folding of the display panel 510 so that the display panel 510 is folded at a predetermined curvature.

In the foldable display apparatus according to the third embodiment of the present invention, the link assembly 540 may be provided in a type where is inverted upward and downward in order for a rotation direction to be opposite, and may be connected between the second housing 530 and the sliding assembly 550. In this case, as illustrated in FIG. 9, in the display panel 510, the first and second display areas 112a and 112b are folded in an outer direction with respect to the bending display area 112c of the display panel 110 along a rotation direction of the link assembly 540.

In the foldable display apparatus according to the third embodiment of the present invention, when the display panel 510 is folded or unfolded, a length deviation of the display panel 510 is compensated for by sliding of the link assembly 540 which interoperates with sliding of the sliding assembly 550, and thus, it is not required to secure a moving space for the second area of the display panel 510, thereby reducing a bezel width.

Figure 14:
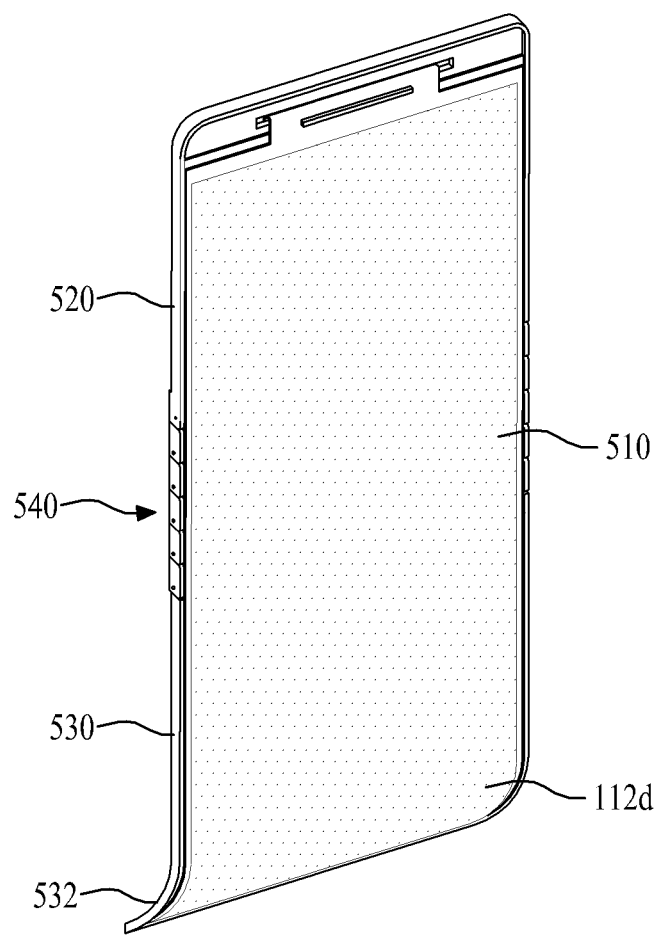
FIG. 14 is a diagram schematically illustrating a foldable display apparatus according to a fourth embodiment of the present invention.
Figure 15:
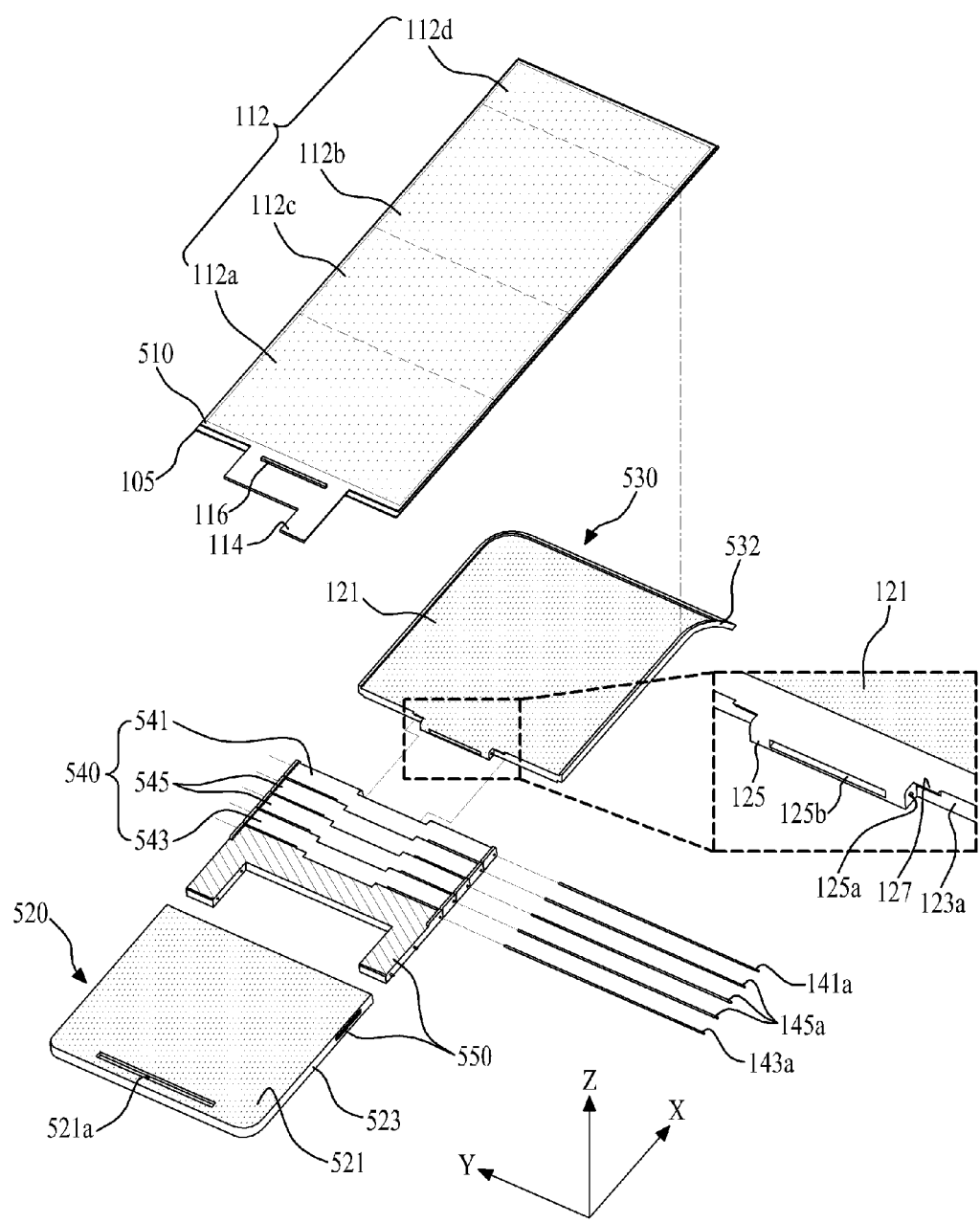
FIG. 15 is an exploded perspective view of the foldable display apparatus according to the fourth embodiment of the present invention.

FIG. 14 is a diagram schematically illustrating a foldable display apparatus according to a fourth embodiment of the present invention. FIG. 15 is an exploded perspective view of the foldable display apparatus according to the fourth embodiment of the present invention, and illustrates a configuration in which structures of the display panel and the second housing are changed in the foldable display apparatus according to the fourth embodiment of the present invention. Therefore, in the following description, different elements will be described.

The display panel 510 further includes an edge bending display area 112d.

The edge bending display area 112d extends from the second display area 112b to have a certain area, and is attached to the second housing 530 to have a certain curvature. The edge bending display area 112d maintains a state, which is bent at a certain curvature, when the display panel 510 is folded or unfolded.

When the display panel 510 is unfolded to a plane state, the edge bending display area 112d according to an embodiment may constitute one display screen along with the first display area 112a, the second display area 112b, and the bending display area 112c.

Figure 16:
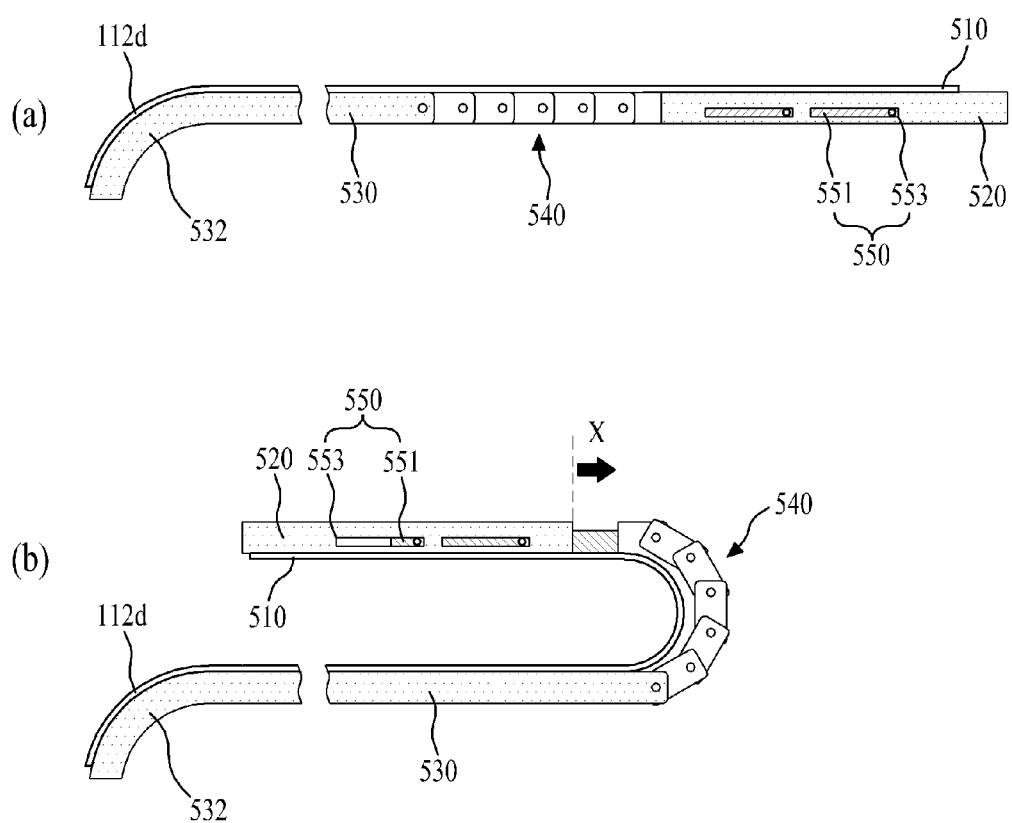
FIG. 16 is a diagram describing an edge bending display area of a display panel in unfolding or folding the display panel, in the foldable display apparatus according to the fourth embodiment of the present invention.

When the display panel 510 is folded or unfolded to a plane state, as illustrated in FIG. 16, an edge bending display area 112d according to another embodiment may constitute a sub-screen irrelevant to the first display area 112a, the second display area 112b, and the bending display area 112c, and display a sub-image for a user interface. Here, the sub-image may be system setting information, the balance of a battery, a sensitivity of wireless communication, time information, and a message reception icon.

A second housing 530 supports the second area of the display panel 510, namely, the second side rear surface of the display panel 510 which overlaps the second display area 112b and the edge bending display area 112d. To this end, the second housing 530 is configured identically to the second housing 530 of the foldable display apparatus according to the fourth embodiment of the present invention, and further includes an edge bending part 532 that bends the edge bending display area 112d at a certain curvature.

The edge bending part 532 is provided in a curved shape to have a predetermined curvature from an upper edge of the second housing 530, and is physically coupled to the edge bending display area 112d of the display panel 510. Therefore, the edge bending display area 112d is maintained in a state which is bent at a curvature corresponding to a curvature of the edge bending part 532.

In the foldable display apparatus according to the fourth embodiment of the present invention, even when the display panel 510 is folded, a sub-image for a user interface is provided to a user through the edge bending display area 112d exposed to the outside.

As described above, according to the embodiments of the present invention, since folding and unfolding of the display panel is guided by the sliding assembly and the link assembly including the plurality of link bars, a bending curvature of a folded display panel is stably maintained, and a bending display area of an unfolded display panel is maintained in a plane state.

Moreover, according to the embodiments of the present invention, a length deviation which occurs in folding and unfolding the display panel is compensated for by the sliding assembly, and thus, a bending stress applied to the bending display area of the display panel is minimized.

Moreover, according to the embodiments of the present invention, since the housing is slid by the sliding assembly in folding and unfolding the display panel, it is not required to secure a moving space for the display panel, and thus, a bezel width is reduced.

Moreover, according to the embodiments of the present invention, even when the display panel is folded, a sub-image for a user interface is provided to a user through an edge bending display area which extends from one side of the display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A foldable display apparatus comprising:
   a display panel folded or unfolded with respect to a bending display area;
   a first housing configured to support a first area of the display panel;
   a second housing physically coupled to a second area of the display panel;
   a link assembly connected between the first and second housings, and configured to support a bending display area of the display panel which is folded or unfolded; and
   a sliding assembly configured to slide the first area or second area of the display panel according to bending of the link assembly,
   wherein the link assembly comprises:
      a first link bar rotatably connected to the first housing;
      a second link bar rotatably connected to the second housing; and
      a plurality of middle link bars rotatably connected between the first link bar and the second link bar,
   wherein the sliding assembly comprises:
      a slider physically coupled to the first area of the display panel, and slid according to the bending of the link assembly; and
      a guider provided at the first housing to guide moving of the slider,
   wherein the slider comprises a pair of rails configured to protrude to a bottom of the first housing, and
   wherein the guider comprises:
      a pair of guide holes provided at the first housing, wherein the pair of rails are respectively inserted into the pair of guide holes; and
      a pair of plates disposed at a bottom of the first housing, and respectively coupled to the pair of rails which are respectively inserted into the pair of guide holes.

2. The foldable display apparatus of claim 1, wherein each of the first link bar, the second link bar, and the plurality of middle link bars comprises a stopper configured to bind a rotation angle of an adjacent link bar connected thereto.

3. A foldable display apparatus comprising:
   a display panel folded or unfolded with respect to a bending display area;
   a first housing configured to support a first area of the display panel;
   a second housing physically coupled to a second area of the display panel;
   a link assembly connected between the first and second housings, and configured to support a bending display area of the display panel which is folded or unfolded; and
   a sliding assembly configured to slide the first area or second area of the display panel according to bending of the link assembly, wherein,
   the sliding assembly is movably connected to the first housing, and
   the link assembly comprises:
   a first link bar rotatably connected to the second housing;
   a second link bar rotatably connected to the sliding assembly; and
   a plurality of middle link bars rotatably connected between the first link bar and the second link bar,
   wherein the second housing comprises an edge bending part which is bent at a certain curvature, and the display panel comprises an edge bending display area physically coupled to the edge bending part, and maintained in a state which is bent at a certain curvature, and
   wherein when the display panel is folded, the edge bending display area of the display panel is exposed to an outside without being covered by the first housing.

4. The foldable display apparatus of claim 3, wherein each of the first link bar, the second link bar, and the plurality of middle link bars comprises a stopper configured to bind a rotation angle of an adjacent link bar connected thereto.

5. A foldable display apparatus comprising:
   a display panel folded or unfolded with respect to a bending display area;
   a first housing configured to support a first area of the display panel;

a second housing physically coupled to a second area of the display panel;

a link assembly connected between the first and second housings, and configured to support a bending display area of the display panel which is folded or unfolded; and a sliding assembly configured to slide the first area or second area of the display panel according to bending of the link assembly, wherein the sliding assembly is movably connected to the first housing, and the link assembly comprises:

a first link bar rotatably connected to the second housing;

a second link bar rotatably connected to the sliding assembly; and a plurality of middle link bars rotatably connected between the first link bar and the second link bar, wherein, the first housing is physically coupled to the first area of the display panel, and the sliding assembly comprises:

a slider rotatably connected to the link assembly, movably disposed at the first housing, and configured to slide the second housing according to the bending of the link assembly; and a guider provided at the first housing to guide moving of the slider.

6. The foldable display apparatus of claim 5, wherein, the sliding assembly further comprises a pair of sliding shafts respectively provided at both sides of the slider, and the guider comprises a pair of guide holes respectively provided at both side walls of the first housing, and configured to guide sliding of the pair of sliding shafts.

7. The foldable display apparatus of claim 5, wherein each of the first link bar, the second link bar, and the plurality of middle link bars comprises a stopper configured to bind a rotation angle of an adjacent link bar connected thereto.

8. The foldable display apparatus of claim 5, wherein, the second housing further comprises an edge bending part which is bent at a certain curvature, and the display panel further comprises an edge bending display area physically coupled to the edge bending part, and maintained in a state which is bent at a certain curvature.

9. The foldable display apparatus of claim 8, wherein when the display panel is folded, the edge bending display area of the display panel is exposed to an outside without being covered by the first housing.

* * * * *